(12) United States Patent
Lin et al.

(10) Patent No.: US 10,489,631 B2
(45) Date of Patent: Nov. 26, 2019

(54) BIOMETRIC IDENTIFICATION MODULE

(71) Applicant: Gingy Technology Inc., Hsinchu (TW)

(72) Inventors: Patrick Lin, Hsinchu (TW); Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 102 days.

(21) Appl. No.: 15/960,518

(22) Filed: Apr. 23, 2018

(65) Prior Publication Data

US 2018/0268194 A1 Sep. 20, 2018

Related U.S. Application Data

(63) Continuation-in-part of application No. 15/662,238, filed on Jul. 27, 2017, now Pat. No. 10,002,281, which is a continuation-in-part of application No. 14/973,686, filed on Dec. 17, 2015, now Pat. No. 9,754,150.

(Continued)

(30) Foreign Application Priority Data

Oct. 19, 2015 (TW) .............................. 104134209 A
Feb. 1, 2018 (CN) .......................... 2018 2 0172161

(51) Int. Cl.
*G06K 9/00* (2006.01)
(52) U.S. Cl.
CPC ................................ *G06K 9/00046* (2013.01)
(58) Field of Classification Search
None
See application file for complete search history.

(56) References Cited

U.S. PATENT DOCUMENTS 6,011,860 A 1/2000 Fujieda et al.
6,061,463 A 5/2000 Metz et al.
(Continued)

FOREIGN PATENT DOCUMENTS

CN 102844769 12/2012
CN 104063094 9/2014
(Continued)

OTHER PUBLICATIONS

Ichiro Fujieda et al.,"Fingerprint input based on scattered-light detection",Applied Optics,vol. 36, No. 35, Dec. 10, 1997,pp. 9152-9156.

*Primary Examiner* — Andrae S Allison
(74) *Attorney, Agent, or Firm* — JCIPRNET

(57) ABSTRACT

A biometric identification module including a light source, a cover plate, a display device, an image-capture device, and a first optical film layer is provided. The display device is disposed between the cover plate and the image-capture device. A first optical film layer is disposed on a first region of the cover plate and located between the first region and the light source, wherein the light beam emitted by the light source passes through the first optical film layer to be sequentially transmitted in the first region and a second region of the cover plate, and a finger disposed on the second region of the cover plate reflects the light beam from the second region of the cover plate. The light beam reflected by the finger sequentially passes through the second region of the cover plate and the display device to be received by the image-capture device.

19 Claims, 14 Drawing Sheets

Related U.S. Application Data

(60) Provisional application No. 62/190,267, filed on Jul. 9, 2015, provisional application No. 62/563,045, filed on Sep. 25, 2017, provisional application No. 62/574,222, filed on Oct. 19, 2017.

(56) References Cited

U.S. PATENT DOCUMENTS

| | | | |
|---|---|---|---|
| 9,754,150 B2 | 9/2017 | Wu | |
| 9,829,614 B2 | 11/2017 | Smith et al. | |
| 10,002,281 B2* | 6/2018 | Wu | G06K 9/0004 |
| 10,410,033 B2* | 9/2019 | He | G06K 9/001 |
| 10,410,036 B2* | 9/2019 | He | G06K 9/00087 |
| 2010/0183200 A1* | 7/2010 | Wu | G06K 9/00046 |
| | | | 382/127 |
| 2010/0208952 A1* | 8/2010 | Wu | G06K 9/00046 |
| | | | 382/124 |
| 2011/0122071 A1* | 5/2011 | Powell | G06F 3/0412 |
| | | | 345/173 |
| 2012/0105614 A1* | 5/2012 | Wu | G06K 9/00046 |
| | | | 348/77 |
| 2012/0321149 A1* | 12/2012 | Carver | G06K 9/0004 |
| | | | 382/124 |
| 2012/0328170 A1* | 12/2012 | Wu | G06K 9/00046 |
| | | | 382/124 |
| 2013/0034274 A1 | 2/2013 | Wu et al. | |
| 2015/0036065 A1* | 2/2015 | Yousefpor | G06K 9/228 |
| | | | 349/12 |
| 2015/0347813 A1* | 12/2015 | Tsen | G06K 9/00046 |
| | | | 382/124 |
| 2015/0371074 A1* | 12/2015 | Lin | H01L 27/14679 |
| | | | 382/124 |
| 2016/0132712 A1* | 5/2016 | Yang | G06K 9/0002 |
| | | | 348/77 |
| 2016/0224816 A1* | 8/2016 | Smith | G02B 27/58 |
| 2016/0247010 A1* | 8/2016 | Huang | G02B 5/20 |
| 2016/0328597 A1* | 11/2016 | Abiko | G06K 9/3233 |
| 2016/0335470 A1 | 11/2016 | Park et al. | |
| 2016/0358005 A1 | 12/2016 | Jiang et al. | |
| 2016/0379039 A1 | 12/2016 | Dagan et al. | |
| 2017/0011251 A1* | 1/2017 | Wu | G06K 9/0004 |
| 2017/0017824 A1 | 1/2017 | Smith et al. | |
| 2017/0061193 A1 | 3/2017 | Young et al. | |
| 2017/0083745 A1 | 3/2017 | Goodelle et al. | |
| 2017/0091506 A1 | 3/2017 | Sinha et al. | |
| 2017/0109561 A1* | 4/2017 | Wyrwas | G06K 9/00046 |
| 2017/0109564 A1* | 4/2017 | Seo | G06K 9/00067 |
| 2017/0169274 A1 | 6/2017 | Sun et al. | |
| 2017/0270342 A1* | 9/2017 | He | G06F 3/0412 |

FOREIGN PATENT DOCUMENTS

| | | |
|---|---|---|
| CN | 204406424 | 6/2015 |
| CN | 206470780 | 9/2017 |
| CN | 206497471 | 9/2017 |
| EP | 2447883 | 5/2012 |
| EP | 2555137 | 2/2013 |
| TW | 201032145 | 9/2010 |
| TW | I557403 | 11/2016 |

* cited by examiner

BIOMETRIC IDENTIFICATION MODULE

CROSS-REFERENCE TO RELATED APPLICATION

This application is a continuation-in-part application of and claims the priority benefit of U.S. application Ser. No. 15/662,238, filed on Jul. 27, 2017, now issued U.S. Pat. No. 10,002,281, which is a continuation-in-part application of and claims the priority benefit of U.S. application Ser. No. 14/973,686, filed on Dec. 17, 2015, now issued U.S. Pat. No. 9,754,150. The prior U.S. application Ser. No. 14/973,686 claims the priority benefits of U.S. provisional application Ser. No. 62/190,267, filed on Jul. 9, 2015, and Taiwan application serial no. 104134209, filed on Oct. 19, 2015. This application also claims the priority benefits of U.S. provisional application Ser. No. 62/563,045, filed on Sep. 25, 2017, U.S. provisional application Ser. No. 62/574,222, filed on Oct. 19, 2017, and China application serial no. 201820172161.2, filed on Feb. 1, 2018. The entirety of each of the above-mentioned patent applications is hereby incorporated by reference herein and made a part of this specification.

BACKGROUND OF THE INVENTION

Field of the Invention

The invention relates to an identification module, and more particularly, to a biometric identification module.

Description of Related Art

In recent years, fingerprint recognition has been the mainstream technique in biometrics and is extensively applied in various mobile apparatuses, in particular apparatuses having a display screen such as smart phones and tablet computers. Moreover, the current user demand for display screen size is increasing, and a narrow-frame or even frameless display apparatus is expected, which inevitably affects the space of the fingerprint recognition device on the apparatus. Therefore, in order to provide a fingerprint recognition device in a full-size screen, an optical fingerprint recognition technique in which a fingerprint sensing device is disposed below the display device has been proposed.

However, since an optical fingerprint recognition technique is adopted, a light-emitting device is required to sense fingerprints, but since the light-emitting device is disposed below the display screen, the light-emitting device needs to be adjusted to high intensity to transmit a light beam with sufficient light intensity to the finger. However, when the light intensity of the light-emitting device is high and the light distribution is overly-concentrated, hot spots readily occur to the fingerprint image obtained by the image-capture device, such that the function of fingerprint recognition is substantially compromised.

SUMMARY OF THE INVENTION

The invention provides a biometric identification module having good performance.

A biometric identification module of the invention includes a light source, a cover plate, a display device, an image-capture device, and a first optical film layer. The light source is configured to emit a light beam. The cover plate has a first region and a second region outside the first region, wherein the light source is located adjacent to the first region of the cover plate. The image-capture device is disposed on the first region of the cover plate and located between the first region of the cover plate and the light source. The light beam emitted by the light source passes through the first optical film layer to be sequentially transmitted in the first region and the second region of the cover plate, and a finger disposed on the second region of the cover plate reflects the light beam from the second region of the cover plate. The light beam reflected by the finger sequentially passes through the second region of the cover plate and the display device to be received by the image-capture device.

In an embodiment of the invention, the cover plate has a first surface to be pressed by a finger and a second surface opposite to the first surface, and the first optical film layer is disposed on the second surface of the first region of the cover plate.

In an embodiment of the invention, the biometric identification module further includes a second optical film layer overlapped with the second region of the cover plate and located between the display device and the image-capture device.

In an embodiment of the invention, a first angle is between the light beam reflected by the finger and passing through the display device that does not enter the second optical film layer and a normal of a light-receiving surface of the image-capture device, a second angle is between the light beam reflected by the finger and passing through the display device and the second optical film layer and the normal of the light-receiving surface of the image-capture device, and the second angle is less than the first angle.

In an embodiment of the invention, the biometric identification module further includes a light-collimating layer located between the second optical film layer and the image-capture device.

In an embodiment of the invention, the biometric identification module further includes a filter layer located between the second optical film layer and the light-collimating layer.

In an embodiment of the invention, the biometric identification module further includes a light-controlling device located between the first optical film layer and the light source.

In an embodiment of the invention, the biometric identification module further includes a light guide layer disposed on the first region and the second region of the cover plate and disposed between the cover plate and the display device. The first optical film layer is disposed on the light guide layer, and a portion of the light guide layer is located between the first region of the cover plate and the first optical film layer. The third optical film layer is disposed on the light guide layer and located between the second region of the cover plate and the light guide layer, wherein the light beam sequentially passes through the first optical film layer located on the first region of the cover plate, is transmitted to the third optical film layer located on the second region of the cover plate via the light guide layer, passes through the third optical film layer, enters the second region of the cover plate, and is reflected by the finger disposed on the second region of the cover plate.

In an embodiment of the invention, the first optical film layer and the third optical film layer are spaced apart by a distance, and the first optical film layer to the third optical film layer are formed by a plurality of microstructures.

Based on the above, since total internal reflection occurs to the light beam in the cover plate or the light guide layer in the biometric identification module of an embodiment of the invention, light beam distribution is uniform, and the issue of hot spots caused by an overly-concentrated distribution of the light beam can be effectively alleviated.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
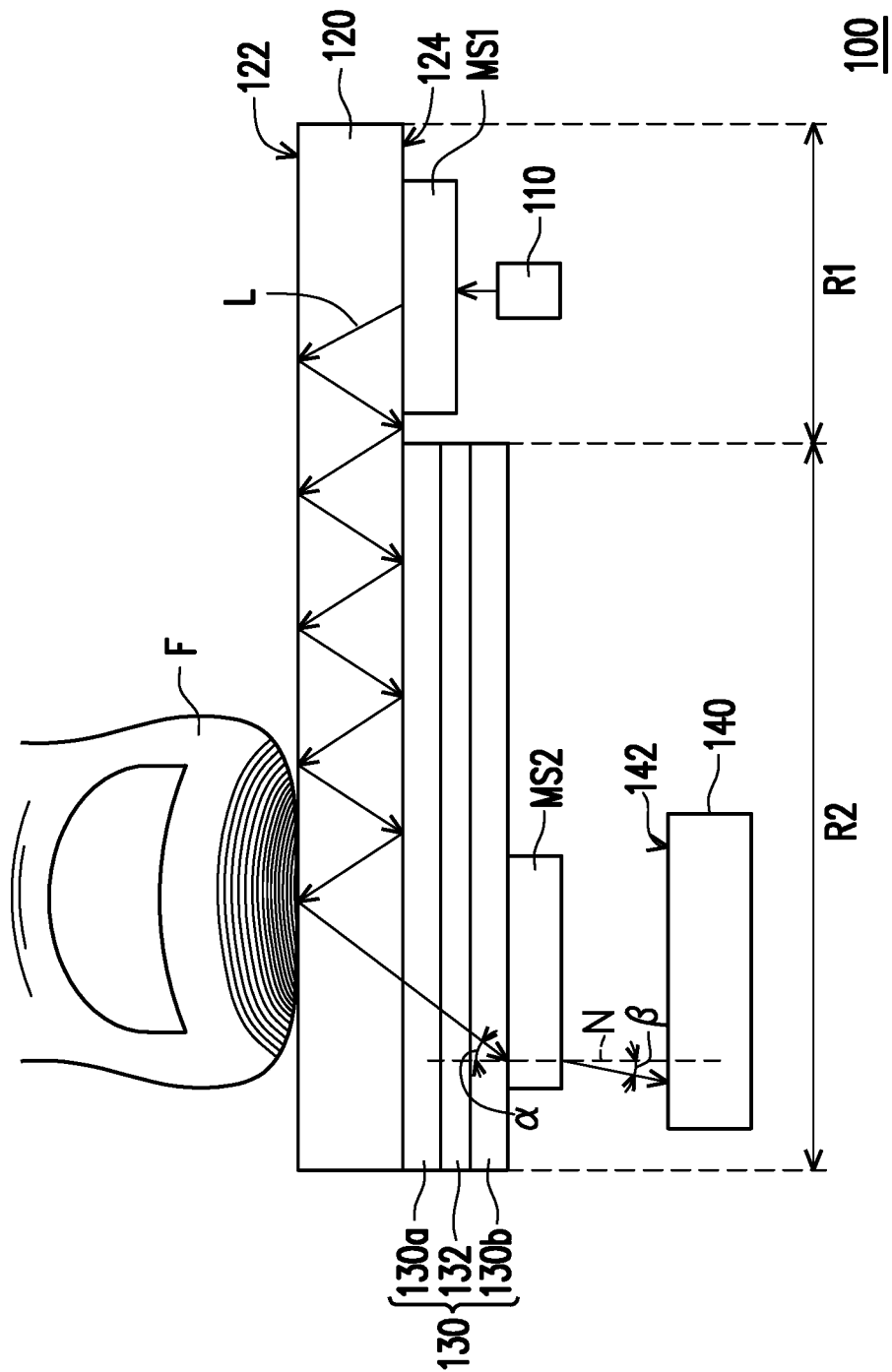
FIG. 1 is a cross section of a biometric identification module according to an embodiment of the invention.

Hereinafter, exemplary embodiments are described with reference to figures. Wherever possible, the same reference numerals are used in the figures and the descriptions to refer to the same or similar parts.

FIG. 1 is a cross section of a configuration of the biometric identification module according to the first embodiment of the invention. Referring to FIG. 1, a biometric identification module 100 is suitable for capturing the biometrics of an analyte F. In the present embodiment, the analyte F is, for instance, a finger, and the biometrics are, for instance, a fingerprint or a vein, but the invention is not limited thereto. For instance, in any embodiment, the analyte F can also be a palm, and the biometrics can be a fingerprint, and the invention is not limited in this regard.

Referring to FIG. 1, the biometric identification module 100 includes a light source 110, a cover plate 120, a display device 130, an image-capture device 140, a first optical film layer MS1, and a second optical film layer MS2. The light source 110 is configured to emit a light beam L, and in the present embodiment, the light beam L emitted by the light source 110 can be visible light beam, invisible light beam, or a combination thereof.

The cover plate 120 has a first region R1 and a second region R2 outside the first region R1. The second region R2 of the cover plate 120 refers to the region of the cover plate 120 overlapped with the display device 130. In the present embodiment, the first region R1 of the cover plate 120 can refer to the region of the cover plate 120 not overlapped with the display device 130, and the light source 110 is located adjacent to the first region R1 of the cover plate 120. In the present embodiment, the second region R2 is used as a touch region touched by a finger F, and the first region R1 is located in the periphery of the touch region. In the present embodiment, the cover plate 120 has a first surface 122 to be pressed by the finger F and a second surface 124 opposite to the first surface 122. For instance, in the present embodiment, the material of the cover plate 120 can be glass, and the cover plate 120 can be referred to as a cover glass. However, the invention is not limited thereto, and in other exemplary embodiments, the material of the cover plate 120 can also be other suitable materials having high transmittance resistant to pressing.

The display device 130 is overlapped with the second region R2 of the cover plate 120. The display panel 130 is disposed below the cover plate 120 and located between the second region R2 of the cover plate 120 and the image-capture device 140. In the present embodiment, the display device 130 can include a first substrate 130a, a second substrate 130b, and a display medium layer 132, wherein the display medium layer 132 is disposed between the first substrate 130a and the second substrate 130b. For instance, in the present embodiment, the display medium layer 132 can be an organic light-emitting diode (OLED) layer or a liquid crystal layer, and the display device 130 is, for instance, an OLED or a liquid crystal display (LCD). However, the invention is not limited thereto, and according to other exemplary embodiments, the display device 130 can also be other suitable types of display.

The first optical film layer MS1 is disposed on the first region R1 of the cover plate 120 and located between the first region R1 of the cover plate 120 and the light source 110. For instance, in the present embodiment, the first optical film layer MS1 can be an optical film layer disposed on the second surface 124 of the cover plate 120. However, the invention is not limited thereto, and according to other embodiments, the first optical film layer MS1 can also be formed on the second surface 124 of the cover plate 120; in other words, in other exemplary embodiments, the first optical film layer MS1 and the cover plate 120 can also be integrally-formed.

In the present embodiment, the first optical film layer MS1 is configured to guide the light beam L emitted by the light source 110 to be transmitted toward a specific direction such that most of the light beam L passing through the first optical film layer MS and entering the first region R1 of the cover plate 120 can be totally reflected by the first surface 122 and be transmitted from the first region R1 of the cover plate 120 toward the second region R2 of the cover plate 120. Accordingly, the light beam L emitted by the light source 110 can be uniformly dispersed on the first surface 122 (i.e., the pressing surface) of the second region R2 to alleviate the issue of hot spots caused by overly-concentrated distribution of the light beam irradiated on the pressing surface in the prior art.

In the present embodiment, the biometric identification module 100 can further include a second optical film layer MS2. The second optical film layer MS2 is overlapped with the second region R2 of the cover plate 120 and located between the display device 130 and the image-capture device 140. For instance, in the present embodiment, the second optical film layer MS2 can be disposed on an outer surface of the second substrate 130b of the display device 130, but the invention is not limited thereto.

The second optical film layer MS2 has the function of changing the transmission direction of the light beam L. Specifically, a first angle α is between the light beam L reflected by the finger F and passing through the display device 130 that does not enter the second optical film layer MS2 and a normal N of a light-receiving surface 142 of the image-capture device 140, a second angle β is between the light beam L reflected by the finger F and passing through the display device 130 and the second optical film layer MS2 and the normal N of the light-receiving surface 142 of the image-capture device 140, and the second angle β is less than the first angle α. Via the function of the second optical film layer MS2, the image-capture device 140 can obtain a clearer fingerprint image to facilitate fingerprint recognition.

Figure 2:
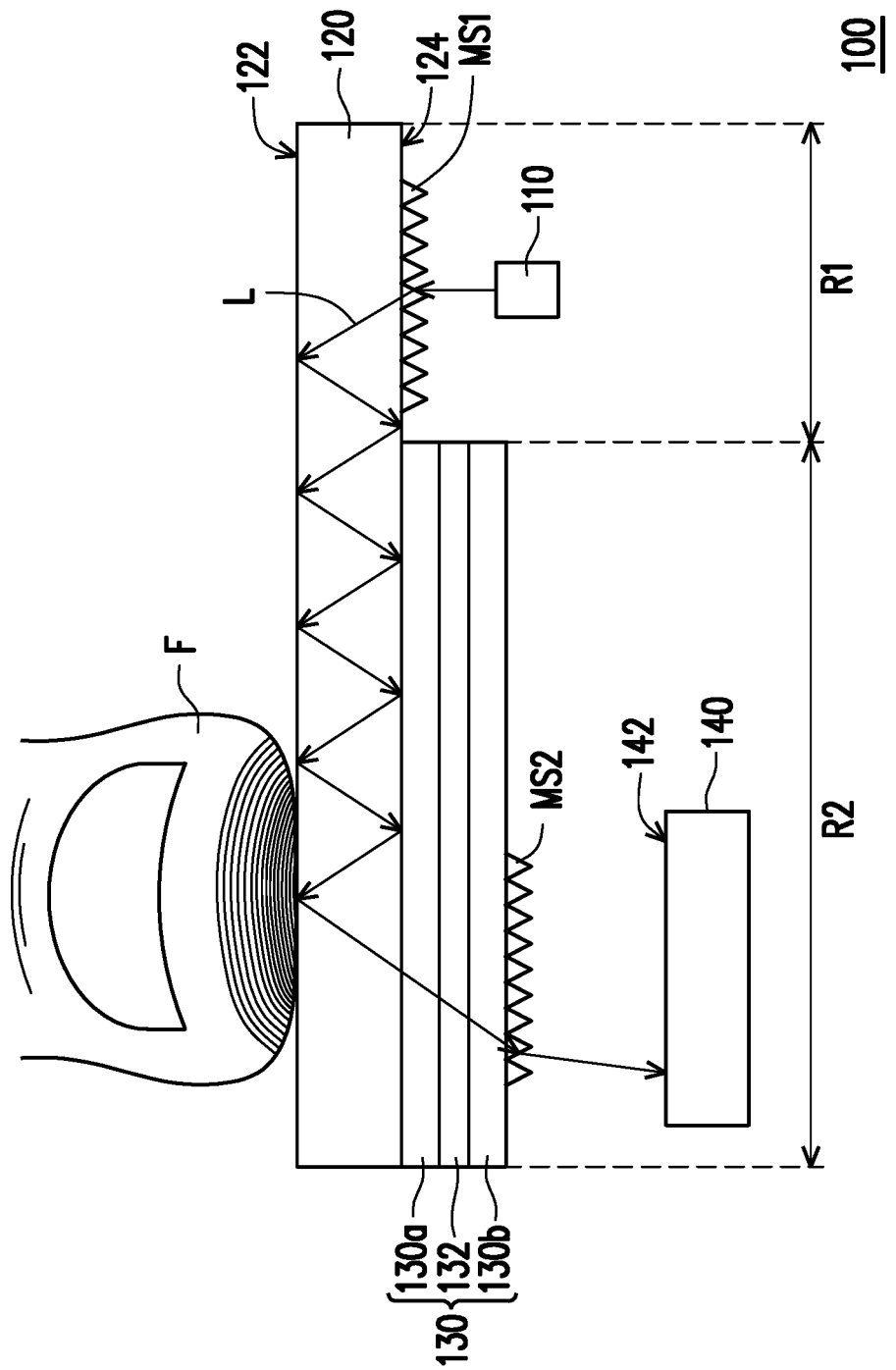
FIG. 2 is a cross section of a biometric identification module according to an embodiment of the invention.

FIG. 2 is a cross section of a biometric identification module according to an exemplary embodiment of the invention. The biometric identification module 100 shown in FIG. 2 is the biometric identification module 100 shown in FIG. 1, but FIG. 2 shows a specific first optical film layer MS1 and second optical film layer MS2 of an embodiment. Referring to FIG. 1 and FIG. 2, in an embodiment, the first optical film layer MS1 and/or the second optical film layer MS2 can be a plurality of prisms. However, the invention is not limited thereto, and in other embodiments, the first optical film layer MS1 and/or the second optical film layer MS2 can also be a plurality of semi-cylinders or other suitable forms of optical microstructures.

Figure 3:
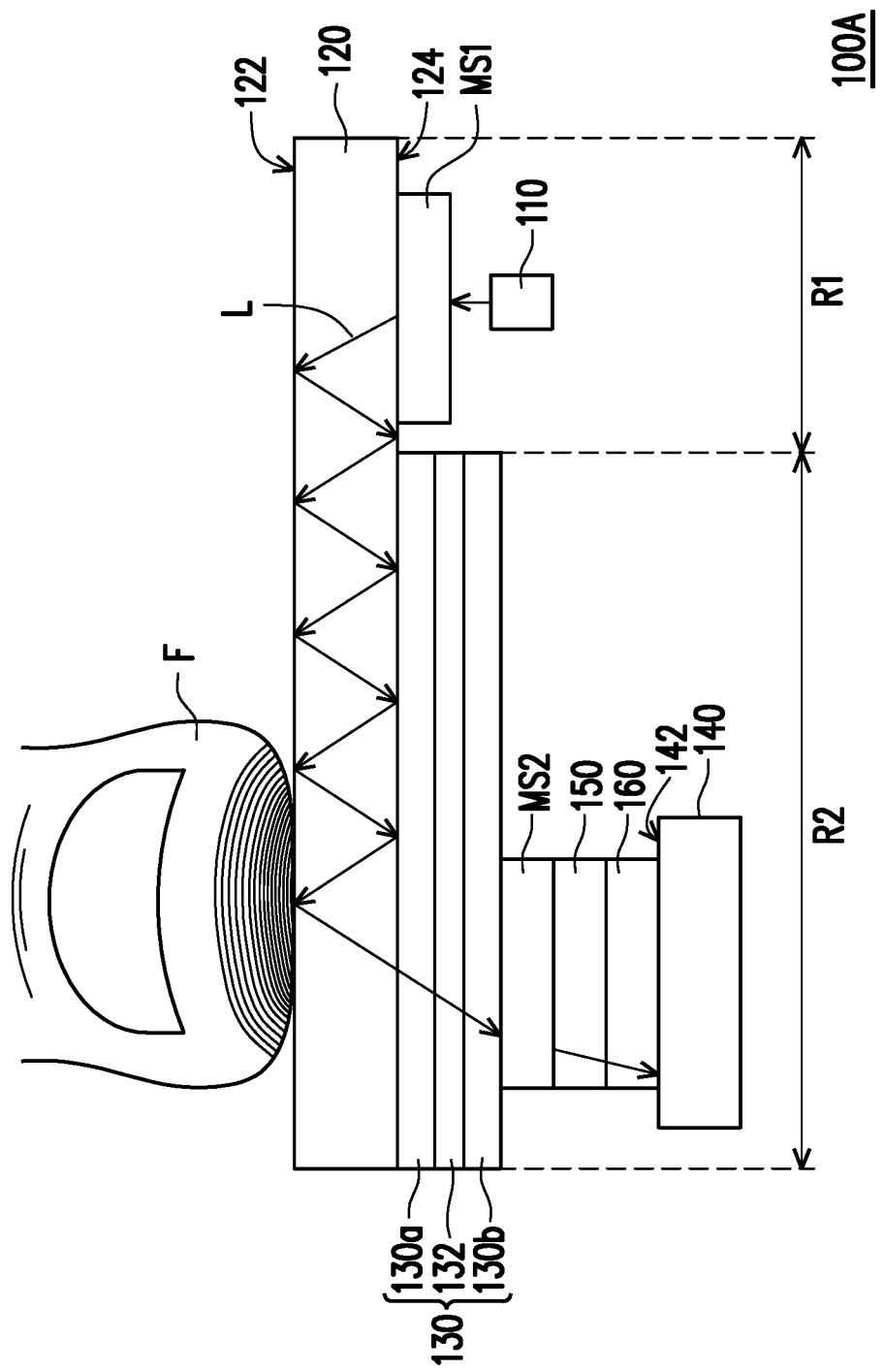
FIG. 3 is a cross section of a biometric identification module according to another embodiment of the invention.

FIG. 3 is a cross section of a biometric identification module according to another embodiment of the invention. Referring to FIG. 1 and FIG. 3, a biometric identification module 100A of FIG. 3 is similar to the biometric identification module 100 of FIG. 1, and the main difference between the two is that the biometric identification module 100A further includes a light-collimating layer 150 and a filter layer 160.

The light-collimating layer 150 is located between the second optical film layer MS2 and the image-capture device 140. The filter layer 160 is located between the second optical film layer MS2 and the light-collimating layer 150. In the present embodiment, the light-collimating layer 150 is configured to transmit the light beam L reflected by the finger F toward the image-capture device 140 in a collimated manner to increase the quality of the fingerprint image obtained by the image-capture device 140. For instance, the light-collimating layer 150 is, for instance, a collimator having a plurality of pinholes, gratings, or fibers, but the invention is not limited thereto.

The filter layer 160 is configured to filter out ambient light outside the wavelength range of the light beam L. For instance, the light beam L is, for instance, infrared, and the filter layer 160 can be an IR pass filter layer. However, the invention is not limited thereto, and according to other embodiments, the filter layer 160 an also be other types of filter layers.

Figure 4:
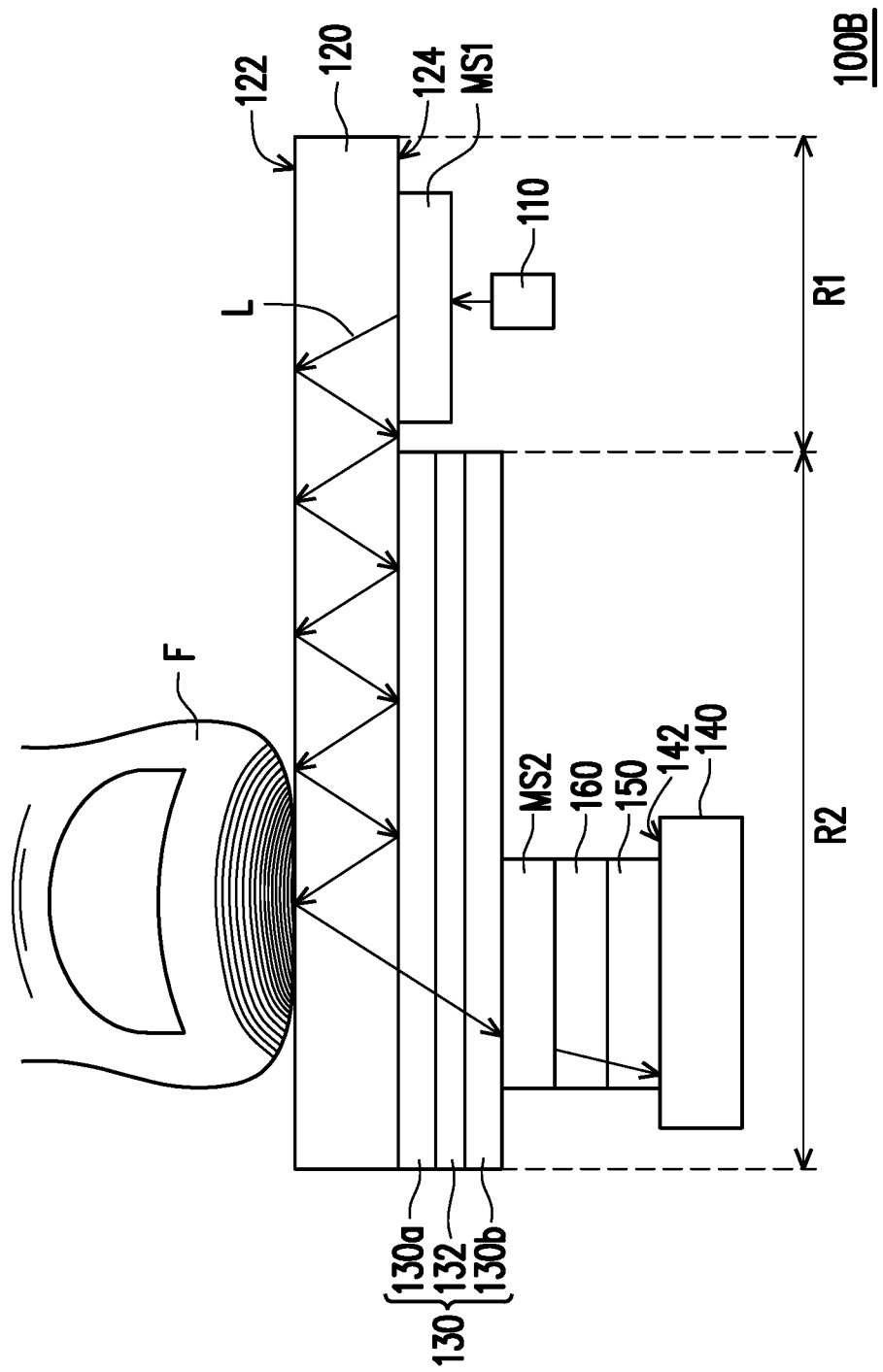
FIG. 4 is a cross section of a biometric identification module of another embodiment shown on the basis of yet another embodiment of the invention.

FIG. 4 is a cross section of a biometric identification module according to yet another exemplary embodiment of the invention. Referring to FIG. 3 and FIG. 4, a biometric identification module 100B of FIG. 4 is similar to the biometric identification module 100A of FIG. 3, and the main difference between the two is that in the biometric identification module 100B of FIG. 3, the filter layer 160 can be located between the second optical film layer MS2 and the light-collimating layer 150.

Figure 5:
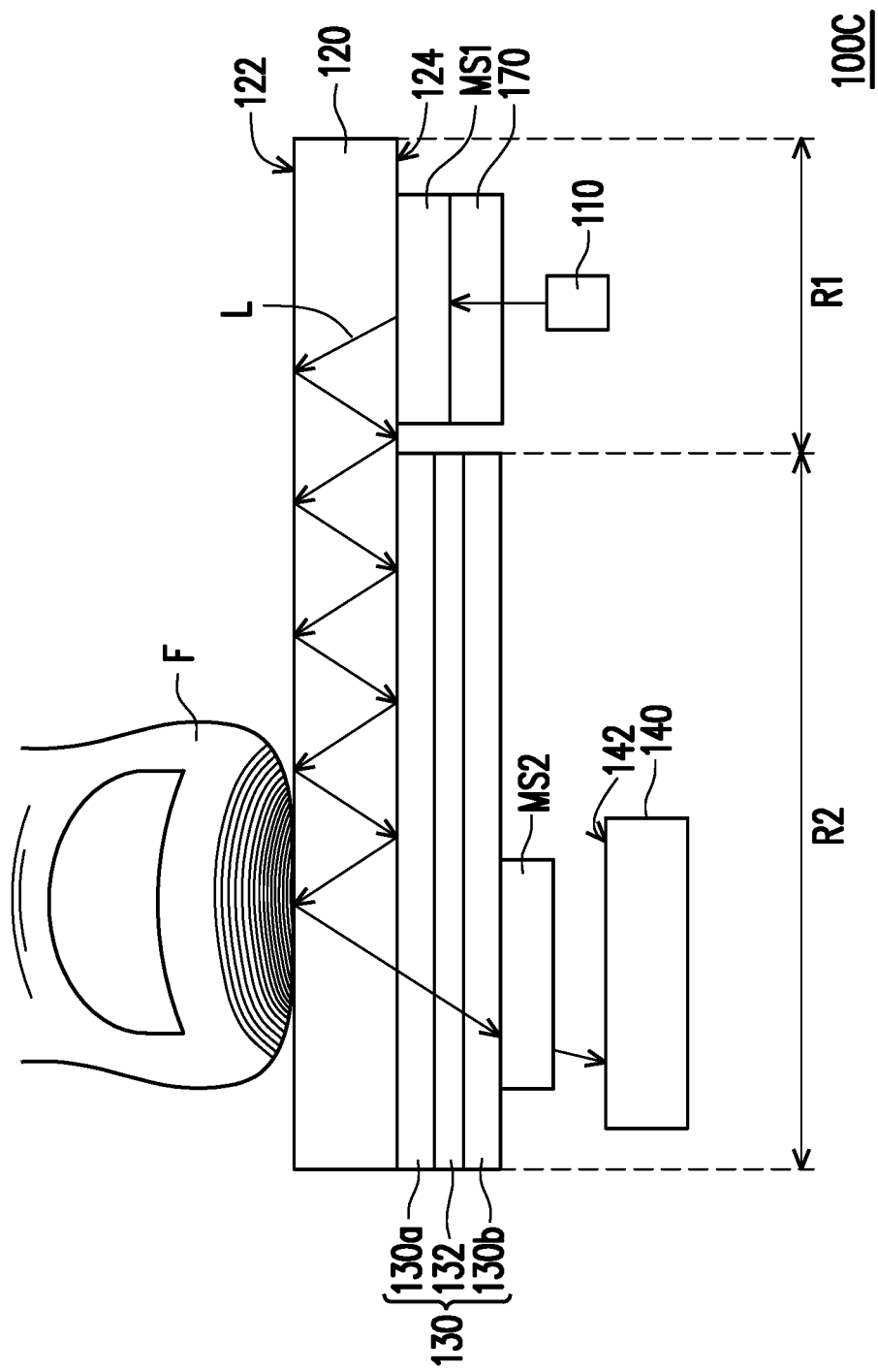
FIG. 5 is a cross section of a biometric identification module according to still yet an embodiment of the invention.

FIG. 5 is a cross section of a biometric identification module according to still yet an embodiment of the invention. Referring to FIG. 1 and FIG. 5, a biometric identification module 100C of FIG. 5 is similar to the biometric identification module 100 of FIG. 1, and the main difference between the two is that the biometric identification module 100C further includes a light-controlling device 170. The light source 170 is located between the first optical film layer MS1 and the light source 110. In the present embodiment, the light beam L emitted by the light source 110 passes through the light-controlling device 170 and enters the first optical film layer MS1 at a predetermined incident angle. The light-controlling device 170 is, for instance, a fiber, but the invention is not limited thereto. The refractive index between the second optical film layer MS2 and the image-capture device 140 is greater than or equal to 1.

Figure 6:
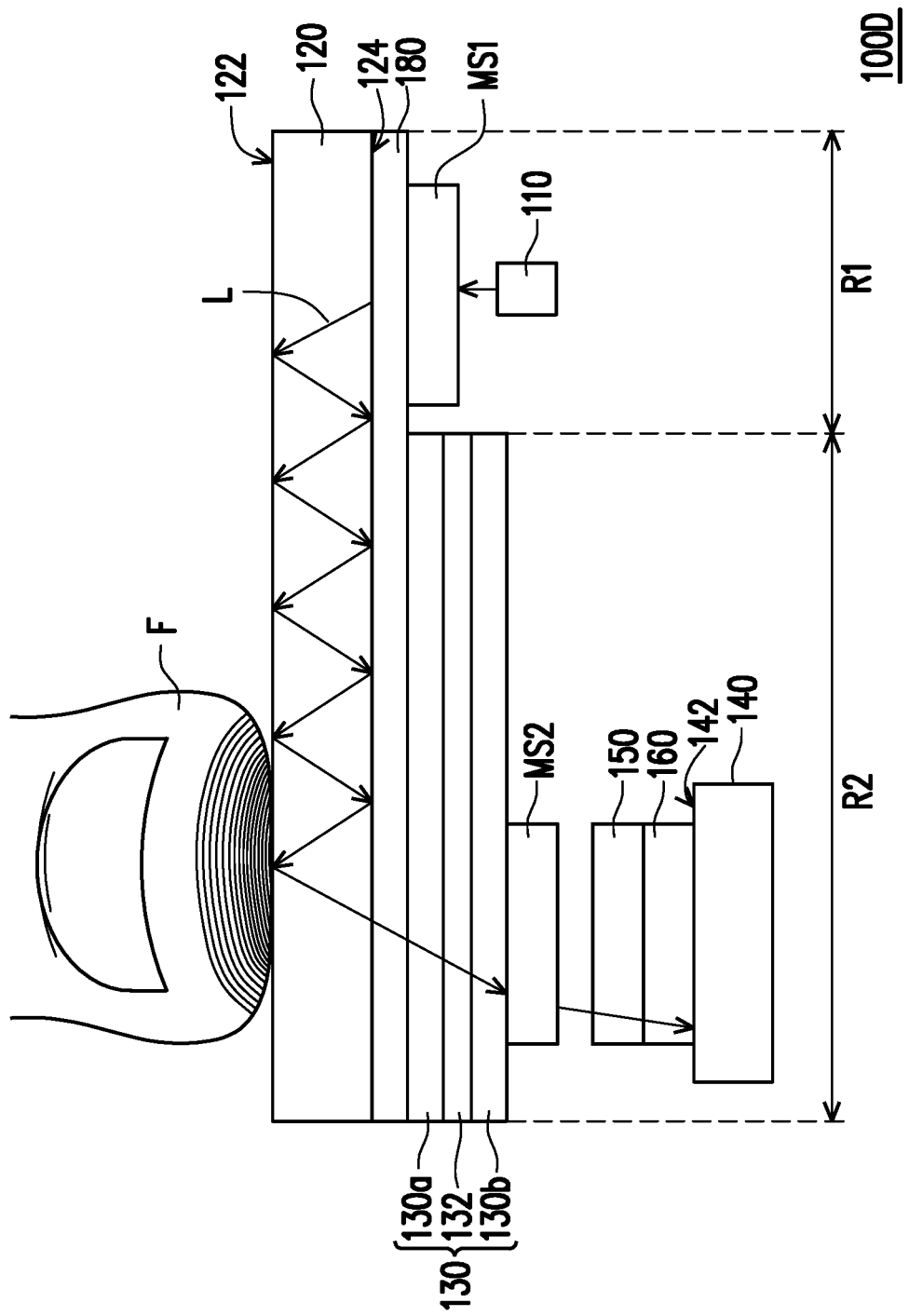
FIG. 6 is a cross section of a biometric identification module according to an embodiment of the invention.

FIG. 6 is a cross section of a biometric identification module according to an embodiment of the invention. Referring to FIG. 3 and FIG. 6, a biometric identification module 100D of FIG. 6 is similar to the biometric identification module 100A of FIG. 3, and the main difference between the two is that the biometric identification module 100D further has a transparent conductive layer 180, the transparent conductive layer 180 is located between the cover plate 120 and the display panel 130, and an air gap can be optionally between the second optical film layer MS2 and the light-collimating layer 150. In the present embodiment, the transparent conductive layer 180 is, for instance, a touch electrode, and can be formed by a single film layer or a plurality of film layers and have a patterned electrode. The refractive index of the transparent conductive layer 180 and the refractive index of an adjacent component (such as the cover plate 120 and the first substrate 130a of the display device 130) can match (such as substantially the same) such that the transmission direction of the light beam L is not readily excessively changed by passing through the transparent conductive layer 180. The refractive index between the second optical film layer MS2 and the light-collimating layer 150 is greater than or equal to 1.

Figure 7:
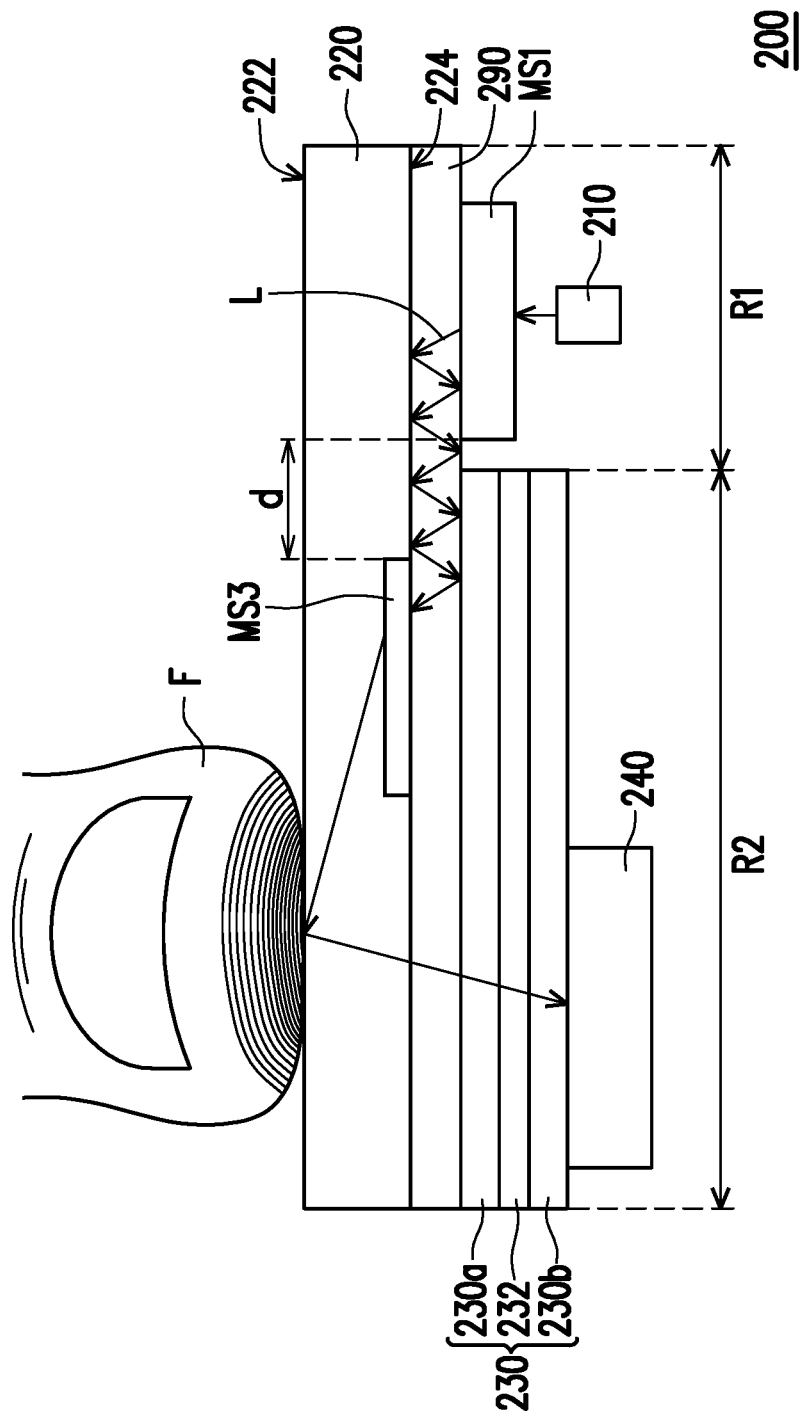
FIG. 7 is a cross section of a biometric identification module according to an embodiment of the invention.

FIG. 7 is a cross section of a biometric identification module according to an exemplary embodiment of the invention. Referring to FIG. 7, the biometric identification module 200 includes a light source 210, a cover plate 220, a display device 230, an image-capture device 240, a light guide layer 290, a first optical film layer MS1, and a third optical film layer MS3. The cover plate 220 has a first region R1 and a second region R2 outside the first region R1, wherein the light source 210 is located adjacent to the first region R1 of the cover plate 220. The cover plate 220 has a first surface 222 to be pressed by the finger F and a second surface 224 opposite to the first surface 222. The light guide layer 290 is located in the first region R1 and the second region R2 and located on the second surface 224. The display device 230 is overlapped with the second region R2 of the cover plate 220. In the present embodiment, the display device 230 can include a first substrate 230a, a second substrate 230b, and a display medium layer 232, wherein the display medium layer 232 is disposed between the first substrate 230a and the second substrate 230b. The display device 230 is located in the second region R2 of the cover plate 220 and located between the light guide layer 290 and the image-capture device 240. The first optical film layer MS1 is disposed in the first region R1 of the cover plate 220 and located between the light guide layer 290 and the light source 210. The third optical film layer MS3 is located in the second region R2 of the cover plate 220 and located between the cover plate 220 and the light guide layer 290.

In the present exemplary embodiment, the first optical film layer MS1 and the third optical film layer MS3 are spaced apart by a distance d, and the first optical film layer MS1 and the third optical film layer MS3 are not overlapped. The light beam L emitted by the light source 210 passes through the first optical film layer MS1 to enter a portion of the light guide layer 290 located in the first region R1; the light beam L entering a portion of the light guide layer 290 located in the first region R1 can be totally reflected by the interface of the cover plate 220 and the light guide layer 290 (i.e., the second surface 224) to be transmitted from a portion of the light guide layer 290 located in the first region R1 to another portion of the light guide layer 290 located in the second region R2. When the light beam L is transmitted to the surface of the third optical film layer MS3 located in the second region R2, total reflection is compromised, and the light beam L can pass through the third optical film layer MS3 to be transmitted to the finger F located on the second region R2 of the cover plate 220. The finger F reflects the light beam L from the second region R2 of the cover plate 220. The light beam L reflected by the finger F sequentially passes through the second region R2 of the cover plate 220, the light guide layer 290, and the display device 230, and is lastly received by the image-capture device 240.

In the present exemplary embodiment, the light guide layer 290 has a high refractive index. The refractive index of the light guide layer 290 is greater than the refractive index of the cover plate 220 and the refractive index of the first substrate 230a of the display device 130. Accordingly, the light beam L can be totally reflected by the interface of the light guide layer 290 and the cover plate 220 and the interface of the light guide layer 290 and the display device 230 to be transmitted from a portion of the light guide layer 290 located in the first region R1 to another portion of the light guide layer 290 located in the second region R2 and be emitted from the place from the location of the third optical film layer MS3. For instance, in the present embodiment, the light guide layer 290 can be at least one continuous translucent electrode of a touch sensing structure, but the invention is not limited thereto.

It should be mentioned that, the biometric identification module 200 of the present embodiment guides the light beam L emitted by the light source 210 to the second region R2 of the cover plate 220 using the light guide layer 290 located below the cover plate 220 such that the light beam L is uniformly irradiated on the finger F. In comparison to the embodiment of FIG. 1 in which the light beam L is transmitted using the cover plate 120 itself, the biometric identification module 200 of the present embodiment can prevent dirt on the first surface 222 of the cover plate 220 or damage of the first surface 222 from affecting the amount of the light beam L transmitted to the second region R2. Therefore, in comparison to the embodiment of FIG. 1, in addition to improving the issue of hot spots, the biometric identification module 200 of the present embodiment also has the advantage of good light utilization efficiency.

Figure 8:
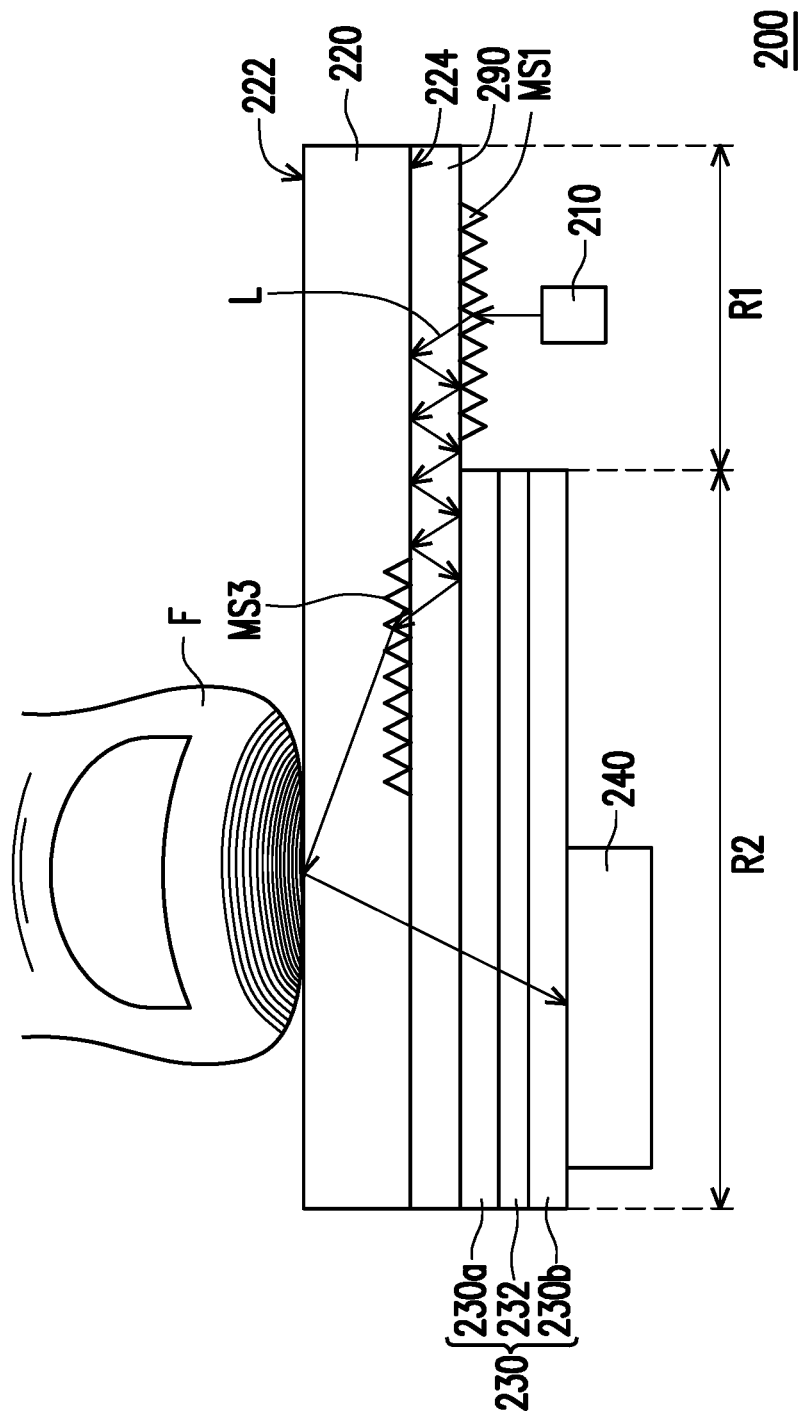
FIG. 8 is a cross section of a biometric identification module according to an embodiment of the invention.

FIG. 8 is a cross section of a biometric identification module according to an embodiment of the invention. The biometric identification module 100 shown in FIG. 8 is the biometric identification module 200 shown in FIG. 7, but FIG. 8 shows a specific first optical film layer MS1 and third optical film layer MS3 of an embodiment. Referring to FIG. 7 and FIG. 8, in an embodiment, the first optical film layer MS1 and/or the third optical film layer MS3 can be a plurality of prisms. However, the invention is not limited thereto, and in other exemplary embodiments, the first optical film layer MS1 and/or the third optical film layer MS3 can also be a plurality of semi-cylinders or other suitable forms of optical microstructures.

Figure 9:
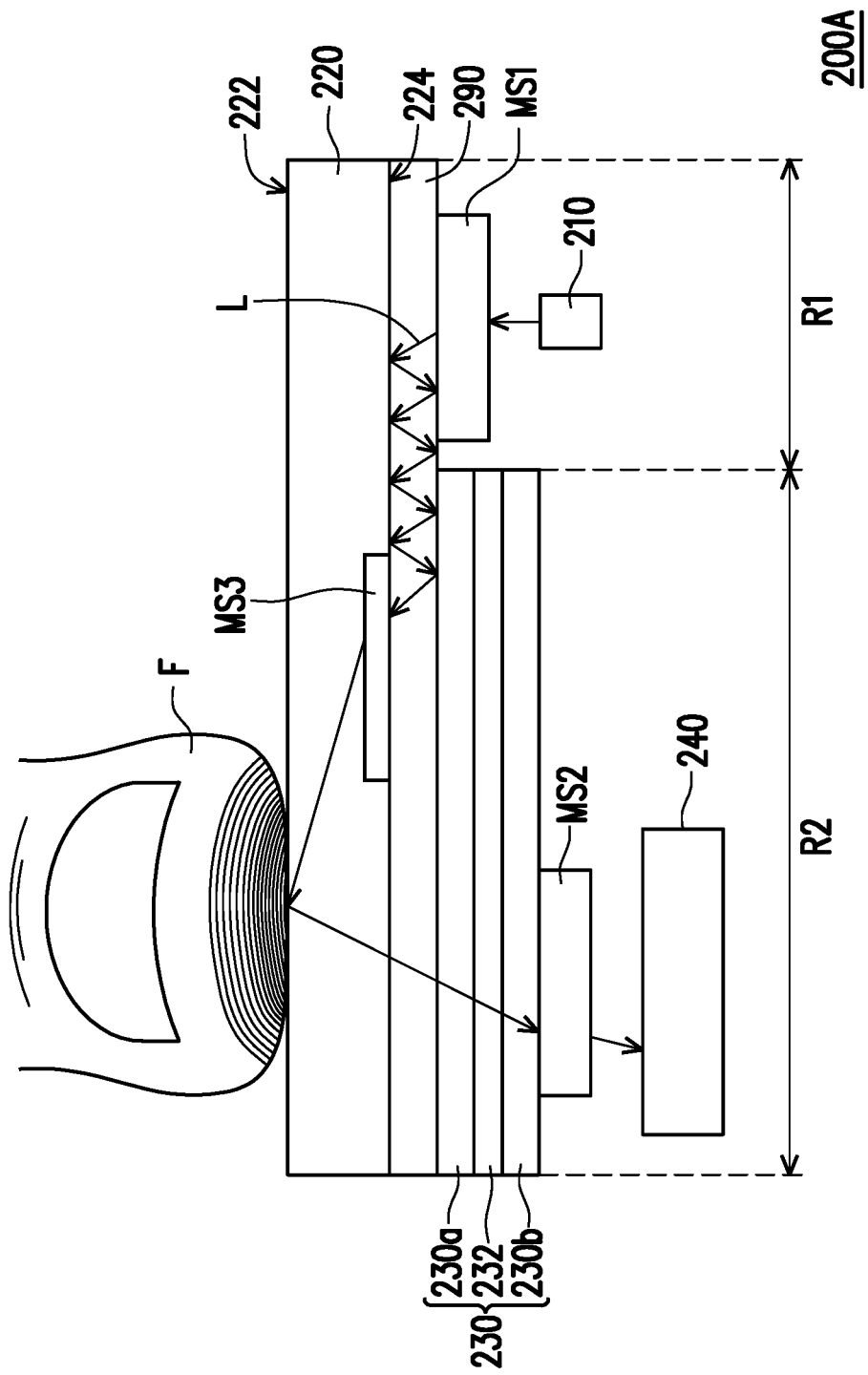
FIG. 9 is a cross section of a biometric identification module according to another embodiment of the invention.

FIG. 9 is a cross section of a biometric identification module according to another embodiment of the invention. Referring to FIG. 7 and FIG. 9, a biometric identification module 200A of FIG. 9 is similar to the biometric identification module 200 of FIG. 7, and the main difference between the two is that the biometric identification module 200A further includes a second optical film layer MS2 located in the second region R2 of the cover plate 220 and located between the display device 230 and the image-capture device 240. The refractive index between the second optical film layer MS2 and the image-capture device 240 is greater than or equal to 1.

Figure 10:
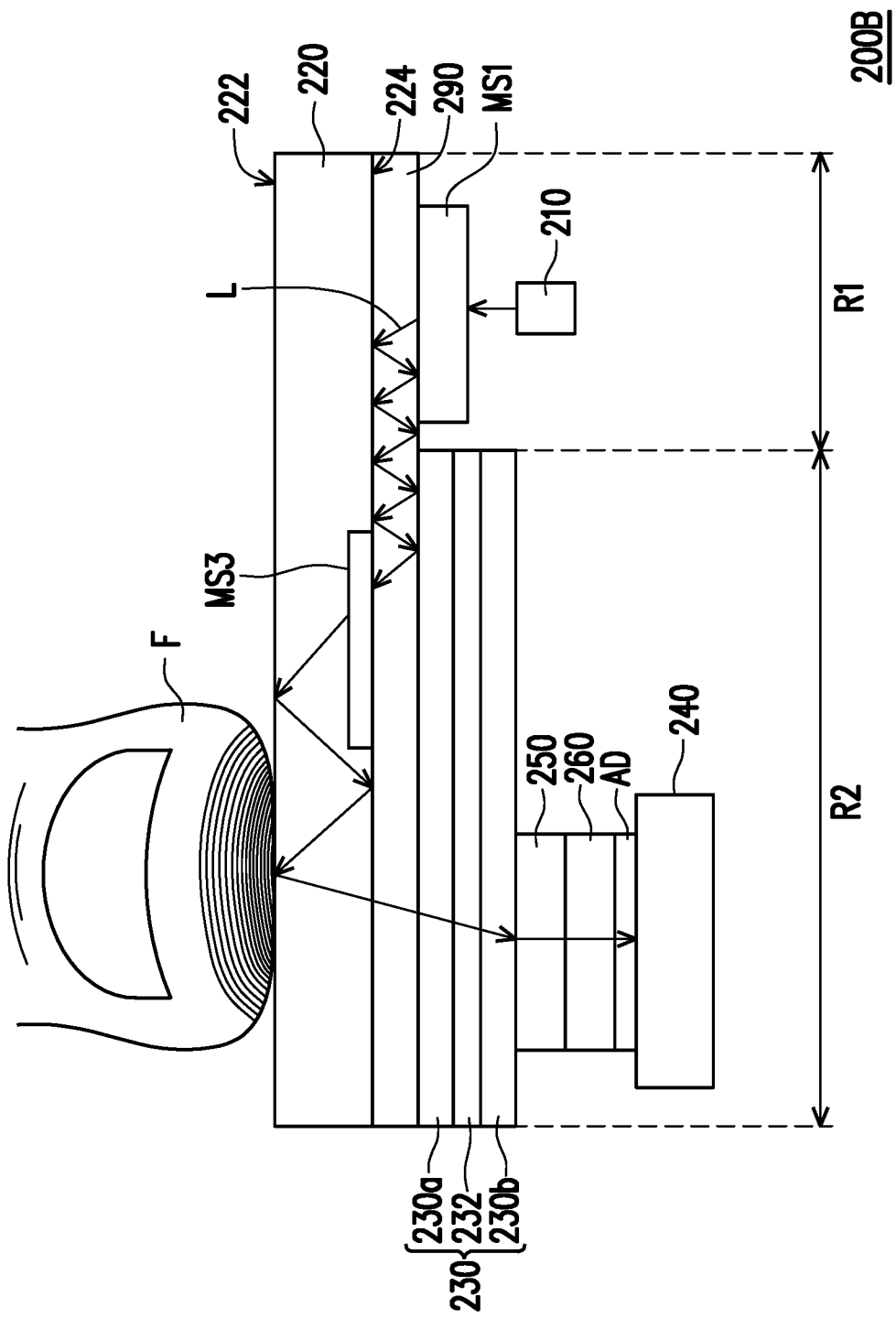
FIG. 10 is a cross section of a biometric identification module according to yet another embodiment of the invention.

FIG. 10 is a cross section of a biometric identification module according to yet another exemplary embodiment of the invention. Referring to FIG. 7 and FIG. 10, a biometric identification module 200B of FIG. 10 is similar to the biometric identification module 200 of FIG. 7, and the main difference between the two is that the biometric identification module 200B further includes a light-collimating layer 250, a filter layer 260, and an adhesive layer AD. The light-collimating layer 250 is located between the display device 230 and the filter layer 260, and the filter layer 260 is located between the light-collimating layer 250 and the image-capture device 240. The adhesive layer AD is located between the filter layer 260 and the image-capture device 240. The filter layer 260 can be fixed on the image-capture device 240 using the adhesive layer AD. In the present embodiment, the adhesive 260 can be, for instance, an optically-clear adhesive (OCA), an optically-clear resin (OCR), or a thermal adhesive, but the invention is not limited thereto.

Figure 11:
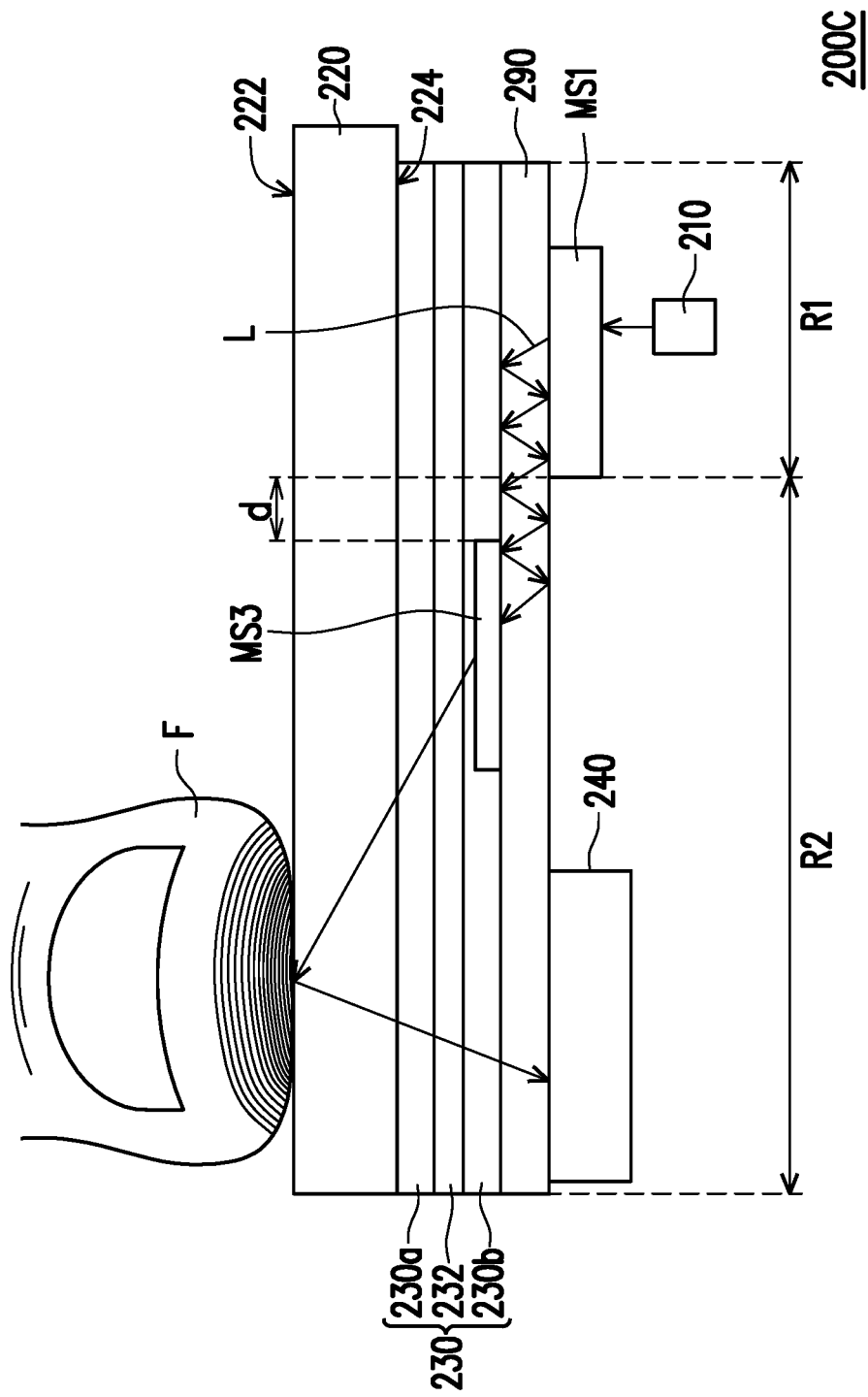
FIG. 11 is a cross section of a biometric identification module according to an embodiment of the invention.

FIG. 11 is a cross section of a biometric identification module according to an exemplary embodiment of the invention. Referring to FIG. 11, a biometric identification module 200C includes a light source 210, a cover plate 220, a display device 230, an image-capture device 240, a light guide layer 290, a first optical film layer MS1, and a third optical film layer MS3. The cover plate 220 has a first region R1 and a second region R2 outside the first region R1, wherein the light source 210 is located adjacent to the first region R1 of the cover plate 220. The cover plate 220 has a first surface 222 to be pressed by the finger F and a second surface 224 opposite to the first surface 222. The display device 230 is located in the first region R1 and the second region R2 of the cover plate 220. In the present embodiment, the display device 230 can include a first substrate 230a, a second substrate 230b, and a display medium layer 232, wherein the display medium layer 232 is disposed between the first substrate 230a and the second substrate 230b. The light guide layer 290 is located in the first region R1 and the second region R2 of the cover plate 220, and the display device 230 is located between the cover plate 220 and the light guide layer 290. The first optical film layer MS1 is disposed in the first region R1 of the cover plate 220 and located between the light guide layer 290 and the light source 210. The third optical film layer MS3 is located in the second region R2 of the cover plate 220 and located between the display device 230 and the light guide layer 290.

In the present embodiment, the first optical film layer MS1 and the third optical film layer MS3 are spaced apart by a distance d, and the first optical film layer MS1 and the third optical film layer MS3 are not overlapped. The light beam L emitted by the light source 210 passes through the first optical film layer MS1 to enter a portion of the light guide layer 290 located in the first region R1. The light beam L entering a portion of the light guide layer 290 located in the first region R1 can be totally reflected by the interface of the second substrate 230b and the light guide layer 290 to be transmitted from a portion of the light guide layer 290 located in the first region R1 to another portion of the light guide layer 290 located in the second region R2. When the light beam L is transmitted to the surface of the third optical film layer MS3 located in the second region R2, total reflection is compromised, and the light beam L can pass through the third optical film layer MS3 and the display device 230 to be transmitted to the finger F located on the second region R2 of the cover plate 220. The finger F reflects the light beam L from the second region R2 of the cover plate 220. The light beam L reflected by the finger F sequentially passes through the second region R2 of the cover plate 220, the display device 230, and the light guide layer 290, and is lastly received by the image-capture device 240.

In the present exemplary embodiment, the light guide layer 290 has a high refractive index. The refractive index of the light guide layer 290 is greater than the refractive indices of the second substrate 230b of the display device 230 and an environmental media (such as air). Accordingly, the light beam L can be totally reflected by the interface of the light guide layer 290 and the interface of the second substrate 230b and the light guide layer 290 and an environmental medium (such as air) to be transmitted from a portion of the light guide layer 290 located in the first region R1 to another portion of the light guide layer 290 located in the second region R2 and be emitted from the place from the location of the third optical film layer MS3. For instance, in the present embodiment, the light guide layer 290 can be one continuous translucent electrode of a touch sensing structure, but the invention is not limited thereto.

Figure 12:
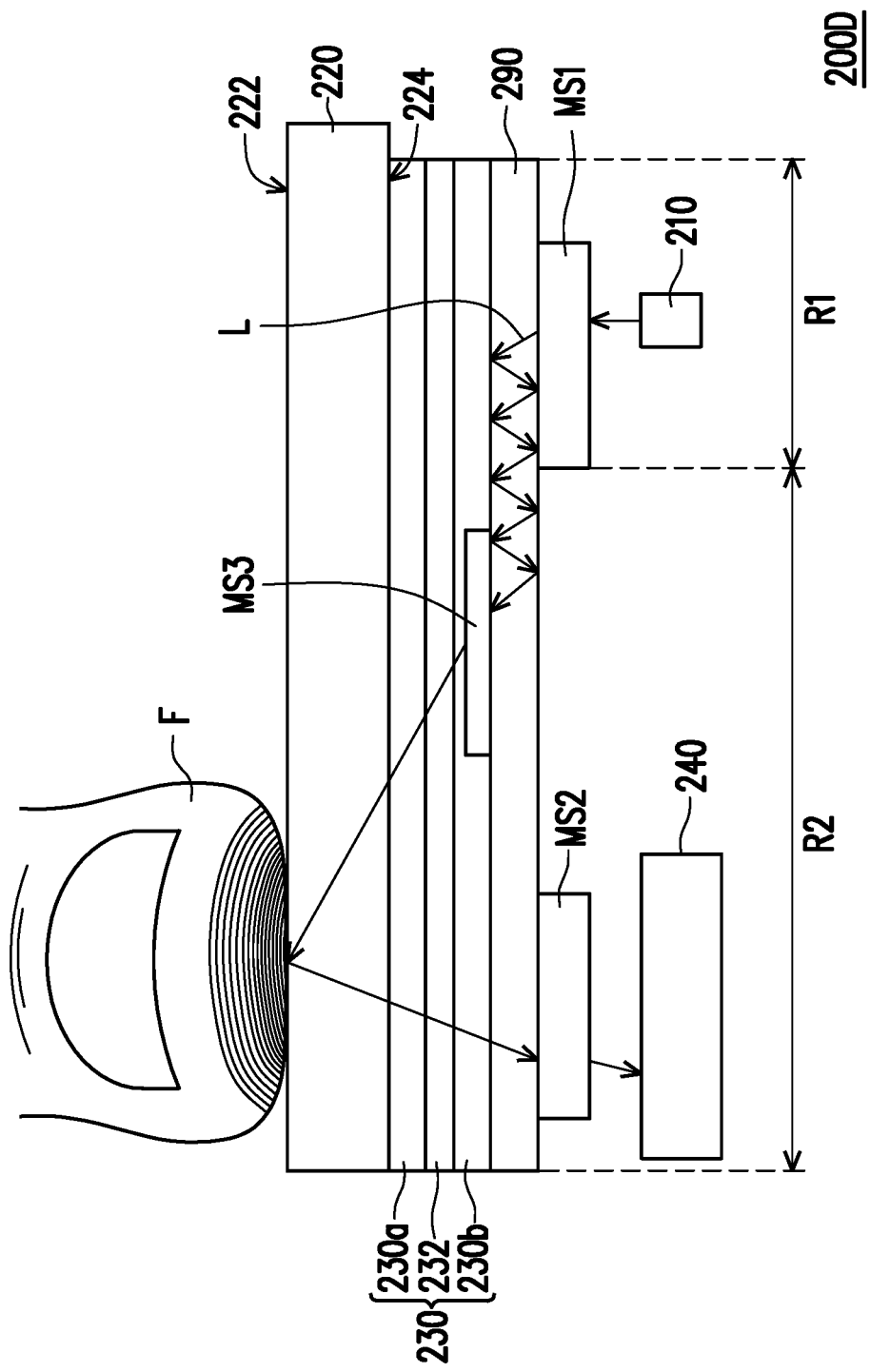
FIG. 12 is a cross section of a biometric identification module according to another embodiment of the invention.

FIG. 12 is a cross section of a biometric identification module of another exemplary embodiment of the invention. Referring to FIG. 11 and FIG. 12, a biometric identification module 200D of FIG. 12 is similar to the biometric identification module 200C of FIG. 11, and the main difference between the two is that the biometric identification module 200D further includes a second optical film layer MS2 located in the second region R2 of the cover plate 220 and located between the display device 230 and the image-capture device 240.

Figure 13:
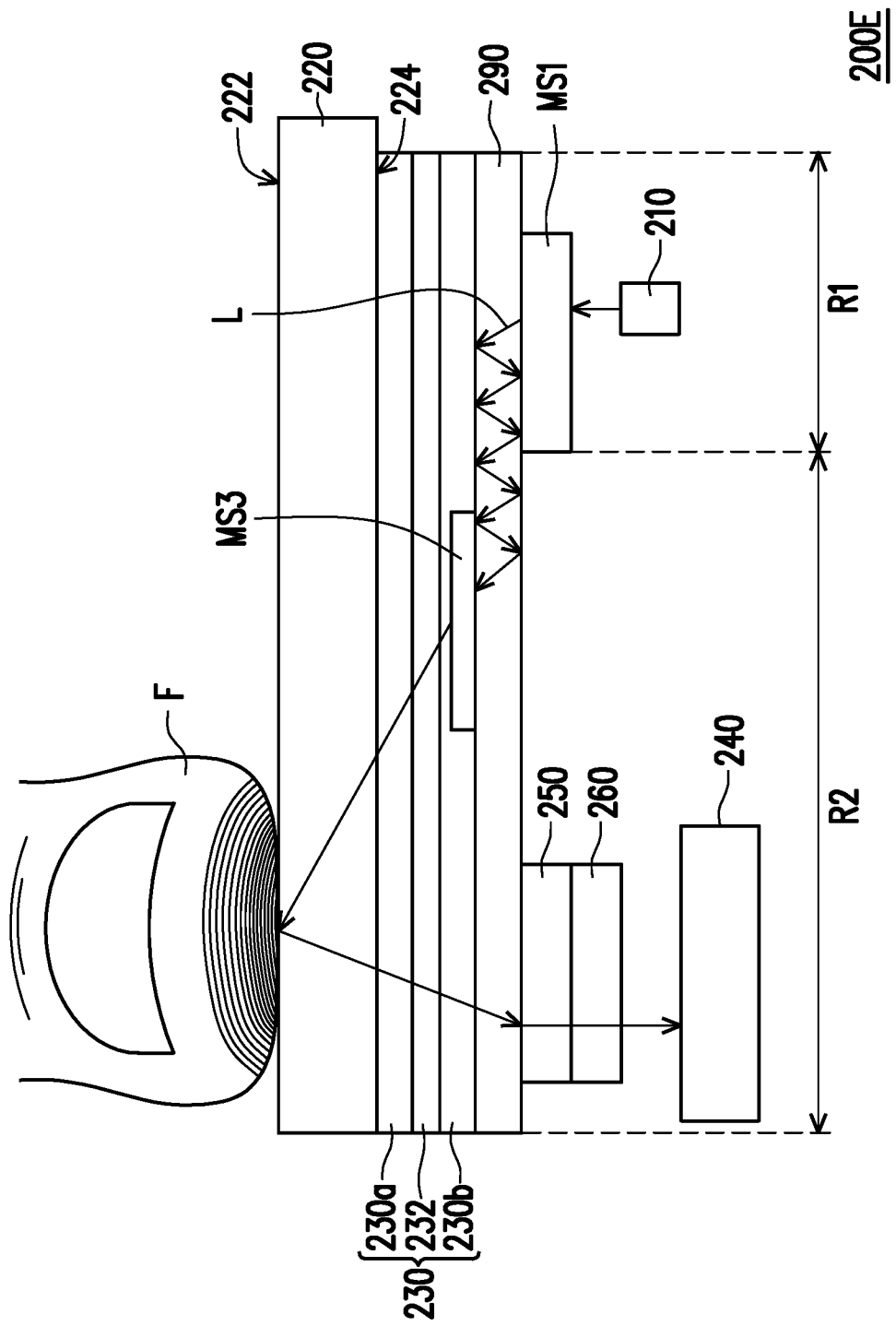
FIG. 13 is a cross section of a biometric identification module according to yet another embodiment of the invention.

FIG. 13 is a cross section of a biometric identification module of yet another exemplary embodiment of the invention. Referring to FIG. 11 and FIG. 13, a biometric identification module 200E of FIG. 13 is similar to the biometric identification module 200C of FIG. 11, and the main difference between the two is that the biometric identification module 200E further includes a light-collimating layer 250 and a filter layer 260. The light-collimating layer 250 is in the second region R2 of the cover plate 220 and located between the light guide layer 290 and the filter layer 260, and the filter layer 260 is located between the light-collimating layer 250 and the image-capture device 240. The refractive index between the filter layer 260 and the image-capture device 240 is greater than or equal to 1.

Figure 14:
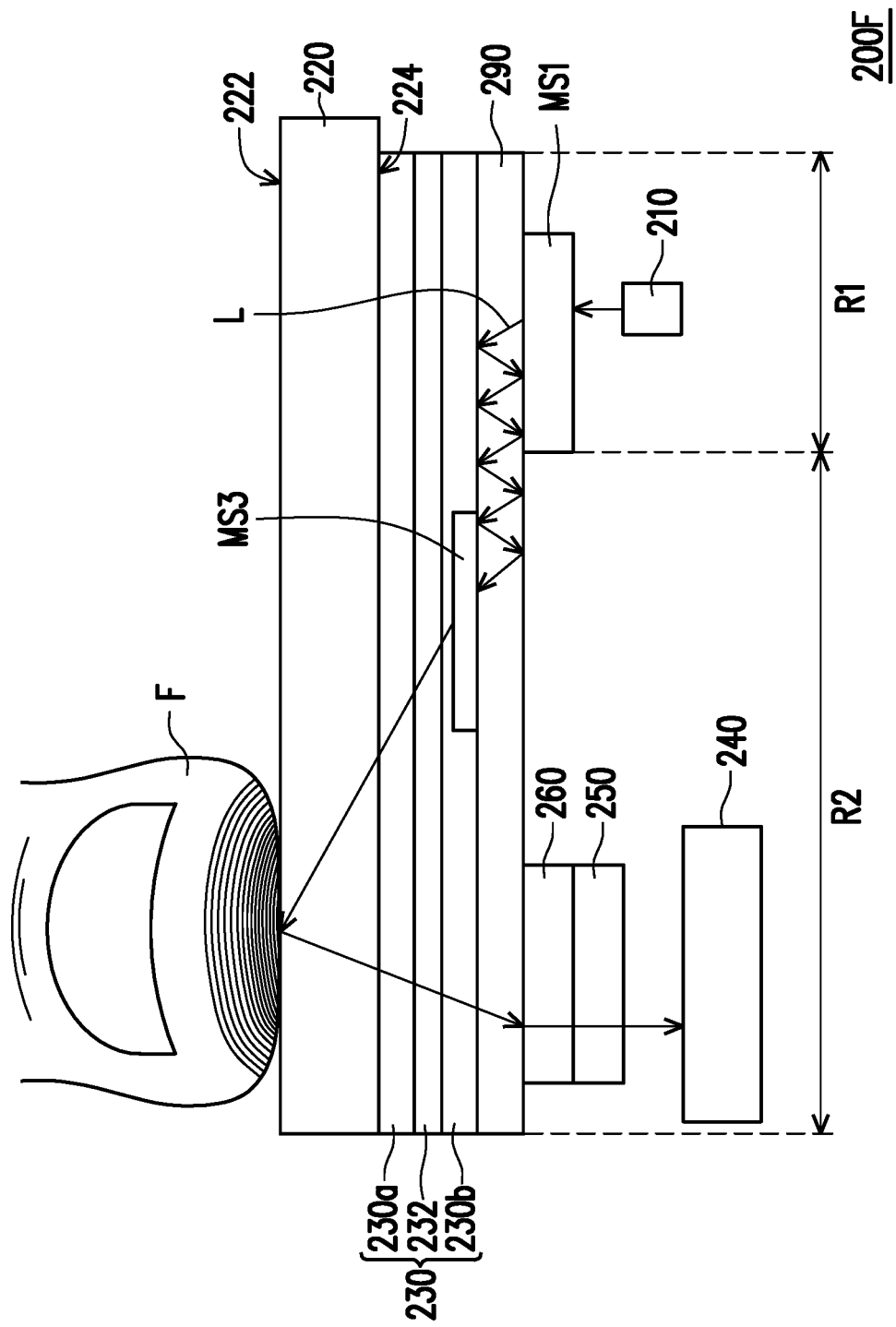
FIG. 14 is a cross section of a biometric identification module according to still yet another embodiment of the invention.

FIG. 14 is a cross section of a biometric identification module according to still yet an embodiment of the invention. Referring to FIG. 13 and FIG. 14, a biometric identification module 200F of FIG. 14 is similar to the biometric identification module 200E of FIG. 13, and the main difference between the two is that the filter layer 260 can be located between the light guide layer 290 and the light-collimating layer 250. The refractive index between the light-collimating layer 250 and the image-capture device 240 is greater than or equal to 1.

Based on the above, the biometric identification module of the invention has at least one optical film layer that can transmit a light beam emitted from a light source toward a specific direction to generate total internal reflection in the cover plate or the light guide layer to disperse the light beam in the cover plate or the light guide layer. Accordingly, the issue of hot spots caused by an overly-concentrated distribution of the light beam irradiated on the pressing surface in prior art can be alleviated.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A biometric identification module configured to obtain a fingerprint image of a finger, the biometric identification module comprising:
   a light source configured to emit a light beam;
   a cover plate having a first region and a second region outside the first region, wherein the light source is located adjacent to the first region of the cover plate;
   a display device;
   an image-capture device, wherein the display device is located between the cover plate and the image-capture device; and
   a first optical film layer disposed on the first region of the cover plate and located between the first region of the cover plate and the light source, wherein the light beam emitted by the light source passes through the first optical film layer to be sequentially transmitted in the first region and the second region of the cover plate, a finger disposed on the second region of the cover plate reflects the light beam from the second region of the cover plate, and the light beam reflected by the finger sequentially passes through the second region of the cover plate and the display device to be received by the image-capture device.

2. The biometric identification module of claim 1, wherein the cover plate has a first surface to be pressed by a finger and a second surface opposite to the first surface, and the first optical film layer is disposed on the second surface of the first region of the cover plate.

3. The biometric identification module of claim 1, further comprising:
   a second optical film layer overlapped with the second region of the cover plate and located between the display device and the image-capture device.

4. The biometric identification module of claim 3, wherein a first angle is between the light beam reflected by the finger and passing through the display device that does not enter the second optical film layer and a normal of a light-receiving surface of the image-capture device, a second angle is between the light beam reflected by the finger and passing through the display device and the second optical film layer and the normal of the light-receiving surface of the image-capture device, and the second angle is less than the first angle.

5. The biometric identification module of claim 3, further comprising:
a light-collimating layer located between the second optical film layer and the image-capture device.

6. The biometric identification module of claim 5, further comprising:
a filter layer located between the light-collimating layer and the image-capture device.

7. The biometric identification module of claim 5, further comprising:
a filter layer located between the second optical film layer and the light-collimating layer.

8. The biometric identification module of claim 3, wherein the second optical film layer is formed by a plurality of microstructures.

9. The biometric identification module of claim 3, further comprising:
a light guide layer disposed on the first region and the second region of the cover plate and disposed between the cover plate and the display device, wherein the first optical film layer is disposed on the light guide layer, and a portion of the light guide layer is located between the first region of the cover plate and the first optical film layer; and
a third optical film layer disposed on the light guide layer and located between the second region of the cover plate and the light guide layer, wherein the light beam sequentially passes through the first optical film layer located on the first region of the cover plate, is transmitted to the third optical film layer located on the second region of the cover plate via the light guide layer, passes through the third optical film layer, enters the second region of the cover plate, and is reflected by the finger disposed on the second region of the cover plate.

10. The biometric identification module of claim 3, further comprising:
a light guide layer, wherein the light guide layer is located between the display device and the image-capture device; and
a third optical film layer disposed on the light guide layer and located between the display device and the light guide layer, wherein the light beam sequentially passes through the first optical film layer located on the first region of the cover plate, is transmitted to the third optical film layer located on the second region of the cover plate via the light guide layer, passes through the third optical film layer, enters the second region of the cover plate, and is reflected by the finger disposed on the second region of the cover plate.

11. The biometric identification module of claim 1, further comprising:
a light-controlling device located between the first optical film layer and the light source.

12. The biometric identification module of claim 1, further comprising:
a light guide layer disposed on the first region and the second region of the cover plate and disposed between the cover plate and the display device, wherein the first optical film layer is disposed on the light guide layer, and a portion of the light guide layer is located between the first region of the cover plate and the first optical film layer; and
a third optical film layer disposed on the light guide layer and located between the second region of the cover plate and the light guide layer, wherein the light beam sequentially passes through the first optical film layer located on the first region of the cover plate, is transmitted to the third optical film layer located on the second region of the cover plate via the light guide layer, passes through the third optical film layer, enters the second region of the cover plate, and is reflected by the finger disposed on the second region of the cover plate.

13. The biometric identification module of claim 12, wherein the first optical film layer and the third optical film layer are spaced apart by a distance.

14. The biometric identification module of claim 12, wherein the display device comprises a first substrate, a second substrate opposite to the first substrate, and a display medium layer disposed between the first substrate and the second substrate, and a refractive index of the light guide layer is higher than a refractive index of the first substrate and a refractive index of the cover plate.

15. The biometric identification module of claim 1, further comprising:
a light guide layer, wherein the light guide layer is located between the display device and the image-capture device; and
a third optical film layer disposed on the light guide layer and located between the display device and the light guide layer, wherein the light beam sequentially passes through the first optical film layer located on the first region of the cover plate, is transmitted to the third optical film layer located on the second region of the cover plate via the light guide layer, passes through the third optical film layer, enters the second region of the cover plate, and is reflected by the finger disposed on the second region of the cover plate.

16. The biometric identification module of claim 15, wherein the first optical film layer and the third optical film layer are spaced apart by a distance.

17. The biometric identification module of claim 15, wherein the display device comprises a first substrate, a second substrate opposite to the first substrate, and a display medium layer disposed between the first substrate and the second substrate, and a refractive index of the light guide layer is higher than a refractive index of the first substrate and a refractive index of an air.

18. The biometric identification module of claim 15, wherein the third optical film layer is formed by a plurality of microstructures.

19. The biometric identification module of claim 1, wherein the first optical film layer is formed by a plurality of microstructures.

* * * * *